United States Patent
King et al.

(10) Patent No.: US 7,011,476 B1
(45) Date of Patent: Mar. 14, 2006

(54) DOUBLE-ENDED GROOVING AND TURNING TOOL WITH CLAMPING SURFACES

(75) Inventors: Ken King, Fort Wayne, IN (US); Doug DeWitt, Columbia City, IN (US); Jeff Frank, Fort Wayne, IN (US); Eric Bustos, Huntington, IN (US); Dave Coleman, Spencerville, IN (US)

(73) Assignee: Kaiser Tool Company, Inc., Fort Wayne, IN (US)

( * ) Notice: Subject to any disclaimer, the term of this patent is extended or adjusted under 35 U.S.C. 154(b) by 0 days.

(21) Appl. No.: 10/919,192

(22) Filed: Aug. 16, 2004

Related U.S. Application Data

(63) Continuation of application No. 10/352,520, filed on Jan. 28, 2003, now Pat. No. 6,824,333, which is a continuation-in-part of application No. 10/218,921, filed on Aug. 14, 2002, now Pat. No. 6,688,816.

(51) Int. Cl.
 B23B 27/04 (2006.01)
 B23P 15/28 (2006.01)
(52) U.S. Cl. .............. 407/102; 407/101; 407/117
(58) Field of Classification Search ............... 407/101, 407/102, 107, 113, 117
 See application file for complete search history.

(56) References Cited

U.S. PATENT DOCUMENTS

| | | | |
|---|---|---|---|
| 513,954 A | 1/1894 | Owen | |
| 1,219,097 A | 3/1917 | Gibbs | |
| 1,395,262 A | 11/1921 | Curtin | |
| 2,480,226 A | 8/1949 | Deibert | |
| 3,296,683 A | 1/1967 | Kaiser | |
| 3,686,729 A | 8/1972 | Cochran | |
| 3,704,497 A | 12/1972 | Derwin | |
| 3,754,309 A | 8/1973 | Jones et al. | |
| 3,758,927 A | 9/1973 | Stein | |
| 3,805,350 A | 4/1974 | Stein | |
| 3,821,837 A | 7/1974 | Faber et al. | |
| 3,981,058 A | 9/1976 | Roos et al. | |
| 4,028,782 A | 6/1977 | Stansak | |
| 4,509,886 A | 4/1985 | Lindsay | |
| 4,669,924 A | 6/1987 | Benson | |
| 4,832,541 A | 5/1989 | Noguchi et al. | |
| 4,973,204 A | 11/1990 | Mihic | |
| 5,076,738 A | 12/1991 | Pano et al. | |
| 5,382,119 A | 1/1995 | Mihic | |
| 5,638,728 A | 6/1997 | Smith et al. | |
| 5,676,495 A | 10/1997 | Katbi et al. | |
| 5,833,403 A | 11/1998 | Barazani | |
| 6,000,885 A | 12/1999 | Erickson | |
| 6,033,158 A | 3/2000 | Fountaine | |

*Primary Examiner*—Derris H. Banks
*Assistant Examiner*—Sara Addisu
(74) *Attorney, Agent, or Firm*—Welsh & Katz, Ltd.

(57) ABSTRACT

Small size insert and insert-blank apparatus for machine tools for grooving and turning have a body with generally parallel and opposing sides, and top and bottom surfaces which have at least a portion thereof inclined from adjacent a first end to the opposite end, and two heads extending from opposite ends of the body, each head having a rear end with which the body forms portions adapted to serve as stops to prevent rearward movement with respect to the machine tool when use. The body of the apparatus is adapted to be mounted in a toolholder having a nest or pocket having an inclined bottom wall which cooperates with the inclined portion of the bottom surface of the apparatus, and a clamp secured to the toolholder having a finger portion cooperative with the inclined portion of the top surface of the apparatus to resist forces on the apparatus during turning.

13 Claims, 7 Drawing Sheets

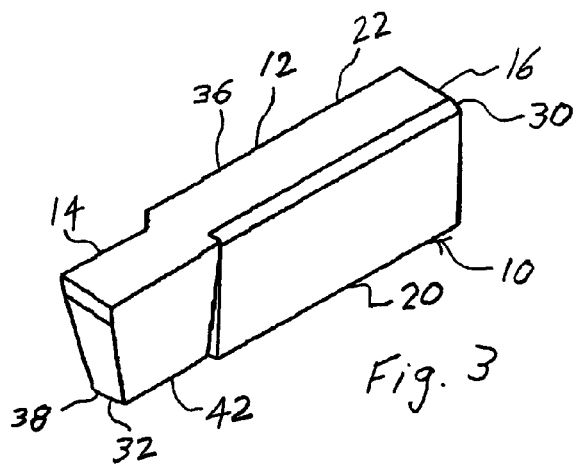
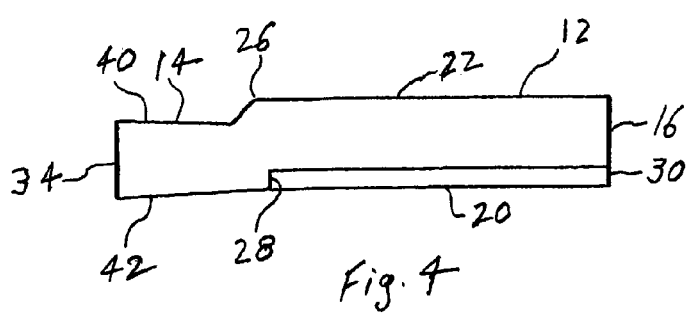
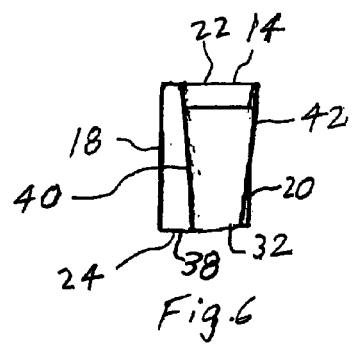
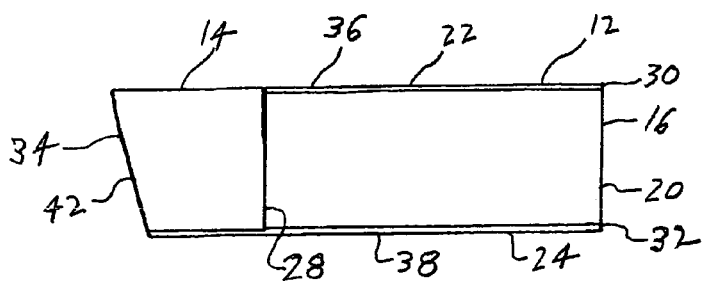

DOUBLE-ENDED GROOVING AND TURNING TOOL WITH CLAMPING SURFACES

This application is a continuation of application Ser. No. 10/352,520 filed Jan. 28, 2003, now U.S. Pat. No. 6,824,333, which in turn is a continuation-in-part of application Ser. No. 10/218,921, filed Aug. 14, 2002, now U.S. Pat. No. 6,688,816, granted Feb. 10, 2004.

BACKGROUND OF THE INVENTION

1. Field of the Invention

The present invention relates to cutting tools, namely inserts for machine tools, and more particularly, to small size inserts for grooving and turning.

2. Description of Related Art

The art of cutting grooves in a workpiece using a cutting tool, and particularly using an insert secured in a toolholder is well known. The use of an insert in a toolholder for turning, i.e., removing portions of material from a rotating workpiece by causing the insert to traverse along a portion of the longitudinal surface of the workpiece while the insert is sequentially advanced into the surface of the workpiece, is also known.

In one method of securing the insert during its use, particularly for grooving, cutting or threading, the insert is clamped adjacent one side of a toolholder. In this arrangement the toolholder has a nest or pocket formed by a bottom wall and a side wall, and the insert is held in position by a top clamp. Such an arrangement is illustrated in U.S. Pat. No. 3,754,309, issued to Jones et al. on Aug. 28, 1973.

Turning, for example in a lathe, advantageously is performed by traversing and removing material from the workpiece in both longitudinal directions. However, attempts to use the same insert within a holder for both grooving and turning, especially during turning in both directions, presents problems in securely and accurately maintaining the insert in position during these operations. In particular, during turning, and most especially upon the workpiece being traversed in the direction outwardly from that side of the holder to which the insert is clamped, the outward end of the insert held by a clamp to the toolholder tends to slip or rotate sideways due to the lateral force of the workpiece on the outward end of the insert. This is particularly the case where the bottom insert supporting surface of the holder is planar and perpendicular to the sides as in U.S. Pat. No. 3,754,309. Even where the bottom insert supporting surface of the holder is not planar, but is angled as in U.S. Pat. No. 6,000,885, issued to Erickson on Dec. 14, 1999, the insert tends to slip or rotate from the holder.

Attempts have been made to overcome the tendency of the insert to slip or rotate in the holder due to lateral force on the insert, for example by forming a diagonal notch in the insert and angling the clamp element to engage the notch and by forming recessed angled portions in the top and/or bottom surfaces of the insert, as in U.S. Pat. Nos. 3,754,309 and 6,000,885. However, such attempts have generally been imperfect to counter the force exerted on the insert as explained in U.S. Pat. No. 6,000,885. Furthermore, the attempts to date have not been applicable to small-size inserts. Small-size inserts are inserts having grooving widths in the range of from about 0.004 inch to about 0.150 inch and a body width in the range of 0.15 inch, for example 0.155 inch. Due to the small size of these inserts, it is impractical to attempt to form diagonal notches and recessed portions in the shank portion of the insert, particularly where the insert is formed of a material such as carbide or of hardened steel.

It is of further utility for inserts to have the capability of being interchangeably mounted in parallel to the longitudinal axis to one side of a toolholder or the other, that is "right hand" or "left hand", or facing to the right or to the left when installed on a toolholder perpendicular to the longitudinal axis of the toolholder for such operations as internal boring.

It is further advantageous in many applications for inserts to have dual cutting regions or heads, for example, so that the insert life can be extended by employing the second cutting head when the first head becomes dull or chipped through use. With some dual head insert configurations, the insert must be inverted as well as reversed in order to employ the second head, as in U.S. Pat. No. 4,669,924, issued to Benson on Jun. 2, 1987, and in U.S. Pat. No. 6,000,885, noted above.

Thus, there exists a need for small-sized inserts which are adapted to resist forces exerted on the insert, particularly during turning.

There is a further existing need for small size inserts which can be mounted on either the right-hand or the left-hand portions of a toolholder to facilitate use of existing toolholders which may be mounted to the machine tool, for particular operations, without the need for changing to a toolholder of the alternate hand configuration, e.g., right-hand to left-hand toolholders. A further need is for inserts with dual cutting heads which can be employed without inverting the insert, thus facilitating mounting the insert to a toolholder. A still further need is for inserts with provision for preventing rearward movement of the insert with respect to the machine tool when in use. Unwanted rearward movement of the insert in the toolholder with respect to the machine tool is undesirable as it may cause the depth of the cut or grooving and/or turning to be in error, and often causes downtime due to the necessity to remount the insert and perhaps require recalibration of the tool to ensure its accurate operation.

SUMMARY OF THE INVENTION

It is an object of the present invention to provide a small-size insert which is securely held within a holder even when encountering lateral forces which tend to move the insert out of position with respect to the holder.

It is another object of the invention to provide a small-size insert which does not require recesses or notches in order to be securely held in position during grooving and turning.

It is still another object of this invention to provide a small size insert which can be securely held in position during grooving, cutting, as well as during turning in both directions along the workpiece.

A further object of this invention is to provide a small-size insert, and a blank therefore which can be formed into an insert, adapted for either right-hand or left-hand mounting to a toolholder.

Another further object of this invention is to provide a small-size insert with dual cutting heads or ends which is adapted for either right-hand or left-hand mounting to a toolholder without the need for inverting the insert for alternate mounting to the toolholder.

Still another further object of this invention is to provide an insert with provision for preventing rearward movement of the insert with respect to the machine tool when in use.

These and other objects and advantages of the present invention will be apparent from the following description.

In accordance with one aspect of the present invention an apparatus is provided which is adapted for use with a machine tool for grooving and turning. The apparatus comprises a body having first and second sides which are generally parallel and opposing each other, first and second ends, and top and bottom surfaces. The sides and top and bottom surfaces of the apparatus extend from adjacent the first end to the second end. Thus, the first end extends longitudinally beyond the sides and top and bottom surfaces of the body. The top surface has at least a portion thereof extending from adjacent the first end to the second end and is inclined downwardly from the perpendicular of the top end of the first side to the second side. The bottom surface has at least a portion thereof extending from at least adjacent the first end to the second end and is inclined upwardly from the perpendicular of the bottom edge of the first side to the second side. In the present invention, the first end may have generally parallel walls and may have a polygonal cross-section, and is adapted to be formed into an insert portion, for example by grinding into a desired shape of a cutting tool and/or grooving tool end. Alternatively, the first end may be a cutting tool and/or grooving tool end.

The apparatus of the present invention is intended to be utilized with a toolholder having a nest or pocket formed having an inclined bottom wall which is adapted to support the bottom surface of the apparatus of the invention. The apparatus of the present invention is intended to be securely retained in the nest or pocket of the toolholder by means of a lever-type clamp which is secured to the toolholder by means of a fastener, such as a machine screw, and exerts a downward force on the body of the apparatus. The clamp with which the apparatus of the present invention is held in the nest or pocket of the toolholder includes an inclined surface or angled end which cooperates with the inclined portion of the top surface of the apparatus to securely hold the apparatus in position in the toolholder.

Preferably, in this aspect of the present invention, the top surface of the apparatus has a second portion extending from adjacent the first end to the second end of the apparatus perpendicularly from the top edge of the first side toward the second side. In such preferred arrangement, the inclined portion of the top surface may extend downwardly from the second portion to the second side at an acute angle with respect to second portion of the top surface. In this manner, the entire top surface need not be inclined, reducing the possibility that a burr or high spot on the nest or pocket bottom wall or on the apparatus body bottom surface may prevent the apparatus from firmly and securely being supported by the nest or pocket bottom wall.

Similarly, the bottom surface of the apparatus may have a second portion extending from adjacent the first end to the second end perpendicularly from the bottom edge of the first side toward the second side. In this preferred arrangement, the inclined portion of the bottom surface may extend upwardly from the second portion to the second side at an acute angle with respect to second portion of said bottom surface. As the lever-type clamp only contacts a portion of the top surface of the apparatus, only the corresponding portion of the top surface of the apparatus need be inclined. In this preferred arrangement, the apparatus of the present invention is securely held in position in the toolholder even upon encountering lateral forces during grooving, as heretofore explained.

In accordance with another aspect of the present invention, the apparatus adapted for use with a machine tool for grooving and turning comprises a head substantially identical to the first end described in connection with the first aspect of the invention described above, and a body integral with the head. As in the case of the first aspect of the invention, the apparatus may be a blank, that is a tool with a head which is unformed, but is capable of being formed into a cutting, grooving and/or turning head, for example, by grinding, or may be an insert with a finished head for cutting, grooving and/or turning, or for other machine tool operation. The head in this aspect has a rear end and the body extends generally longitudinally, i.e., rearwardly, from the rear end of the head. The body has first and second sides which are generally parallel to and opposing each and extends from the rear end of the head to the distal end of the body which corresponds to the second end of the body in the first aspect described above.

The body of the apparatus in this aspect of the invention includes top and bottom surfaces which extend from the rear end of the head to the distal end and from the first side to the second side. The top surface has a first portion intersecting with and extending from the rear end of the head to the distal end of the body and is inclined upwardly from the first side of the body. The top surface has a second portion intersecting with and extending from the rear end of the head to the distal end of the body and is inclined upwardly from the second side of the body. The inclined first and second portions of the top surface of the body desirably cooperates with a lever-type clamp to secure the apparatus in the nest or pocket of a toolholder as heretofore described in connection with the first aspect of the invention. The advantage of having first and second inclined top surface portions is that the apparatus can be oriented in either a right-hand or left-hand toolholder, which are known to the art, and clamped therein with the clamp exerting the clamping force on the corresponding inclined top surface portion.

The top surface of the body of the apparatus of this aspect of the invention may include a third portion extending from the rear end of the head to the distal end of the body and from the first top surface portion to the second top surface portion. Preferably, the third top surface portion extends substantially perpendicularly from the plane of at least one of the sides of the body. Also, preferably the first and second top surface portions extend at acute angles, respectively, from the third portion downwardly to the first and second sides of the body.

The bottom surface also desirably has first and second surface portions each intersecting with and extending from the rear end of the head to the distal end of the body and inclined downwardly from respective first and second sides of the body. The bottom surface of the body of the apparatus with its first and second inclined portions forms a shallow V-shape extending in the longitudinal direction, and is adapted to fit and be seated into a nest or pocket of a toolholder with an inclined bottom surface as heretofore described. The first and second inclined bottom portions of the body of the apparatus in this aspect of the invention provides the apparatus with the capability to be secured within the nest or pocket of right-hand or left-hand toolholders with inclined bottom surfaces, with the corresponding bottom surface portion resting on the inclined bottom surface of the pocket of either type of holder.

Further in this aspect of the invention, the rear end of the head of the apparatus has rearwardly facing portions or triangular corners below its intersections with the downwardly inclined first and second bottom surface portions of the body of the apparatus. These rearwardly facing portions of the rear end of the head are adapted to each or both serving as stops of the apparatus which may bear against a surface of the toolholder to prevent rearward movement of the apparatus with respect to the machine tool when in use. The rear end of the head of the apparatus may also have rearwardly facing portions or triangular corners above its intersections with the upwardly inclined first and second portions of the top surface of the body. These portions or corners can also serve as stops to prevent rearward movement of the apparatus with respect to the machine tool when in use. As in the case of the lower rearward facing portions or corners of the rear end, either upper portion or both may bear against a surface of the toolholder in preventing rearward movement. By "rearward movement" as described herein, the movement which is sought to be prevented is rearward movement of the apparatus, which in the case of the apparatus mounted transversely to the toolholder similar to the transverse mounting arrangement of an insert and support shown in FIG. 6 of Smith et al., U.S. Pat. No. 5,638,728, issued Jun. 17, 1997, as compared to the longitudinal mounting of an insert and support shown in FIG. 1 of that patent. It is further contemplated that both lower rear end rearward facing portions or corners described herein may serve as stops against rearward movement for balanced preventive force, or the upper portions or corners or both top and bottom rearward facing portions or corners may serve as stops against rearward movement of the apparatus.

In still another aspect of this invention, the apparatus comprises a second head extending from the distal end of the body of the apparatus. The second head may be the mirror image of the head described above. The advantage of having apparatus with a second head will be apparent to those skilled in the art, particularly for extending the life of the apparatus when formed into an insert or as an insert if previously so formed, by employing the second head when the cutting surface of surfaces of the first head becomes dull or otherwise unusable as a practical matter through use.

BRIEF DESCRIPTION OF THE DRAWING

FIG. 3 is a perspective view of an insert in accordance with one embodiment of the present invention;

FIG. 4 is a top view of the insert of FIG. 3;

FIG. 5 is a right side view of the insert of FIG. 3;

FIG. 6 is a front end view of the insert of FIG. 3;

DESCRIPTION OF THE PREFERRED EMBODIMENTS

Figure 1:
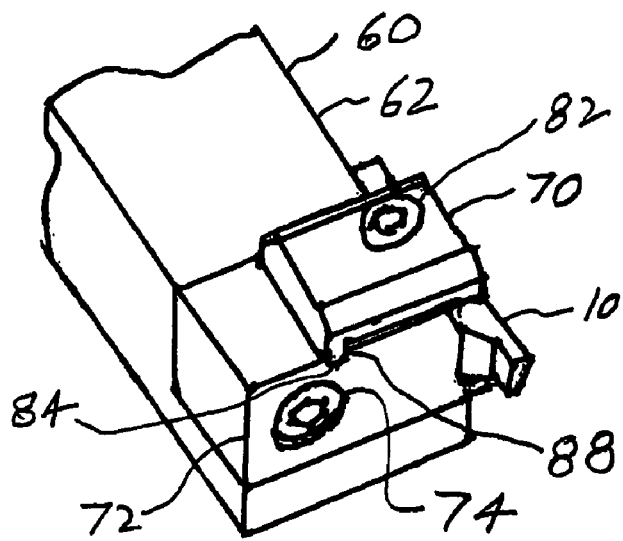
FIG. 1 is a fragmentary perspective view of apparatus in accordance with the present invention mounted and clamped to a toolholder and secured thereto.
Figure 2:
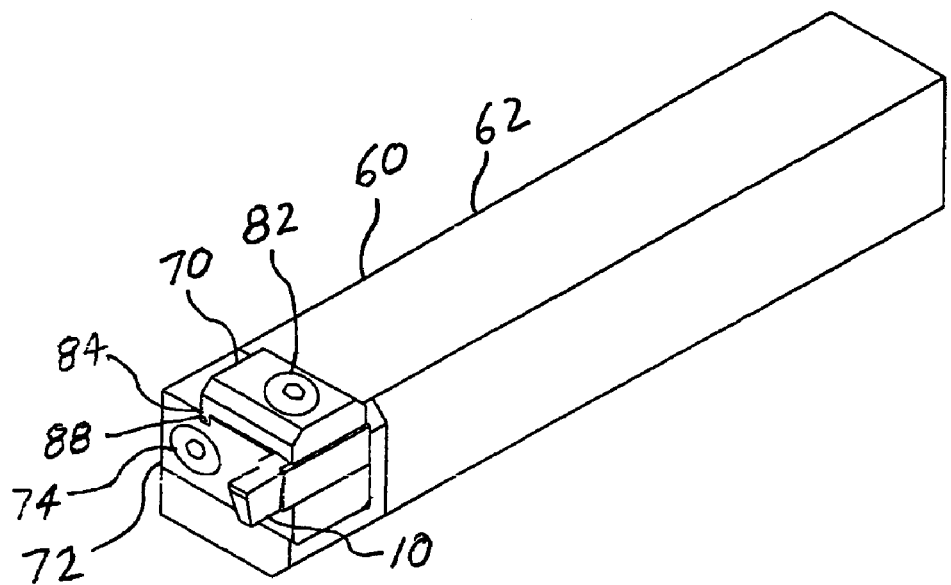
FIG. 2 is another fragmentary perspective view of the apparatus as in FIG. 1 taken from a different orientation.
Figure 7:
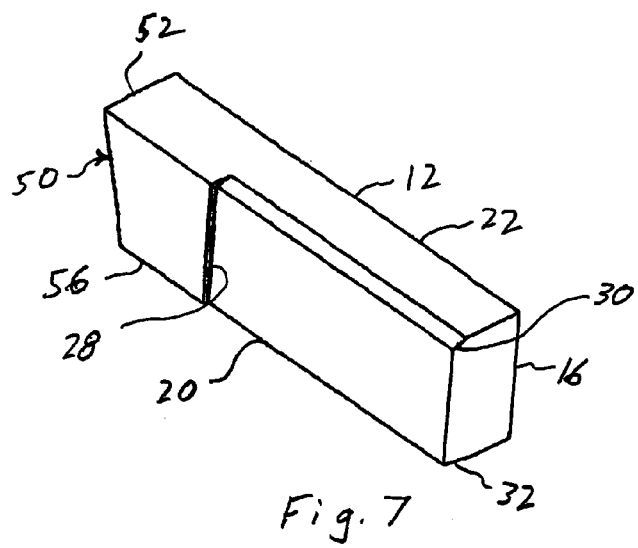
FIG. 7 is a perspective view of a insert-blank in accordance with another embodiment of the present invention.
Figure 10:
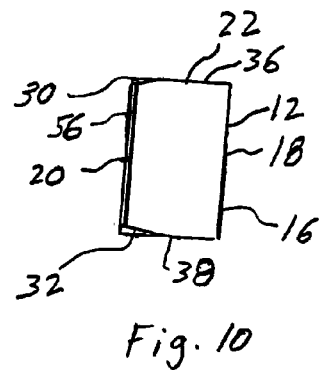
FIG. 10 is a rear end view of the insert-blank of FIG. 7.
Figure 8:
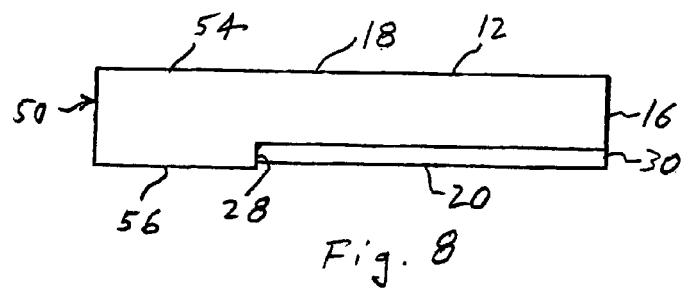
FIG. 8 is a top view of the insert-blank of FIG. 7.
Figure 9:
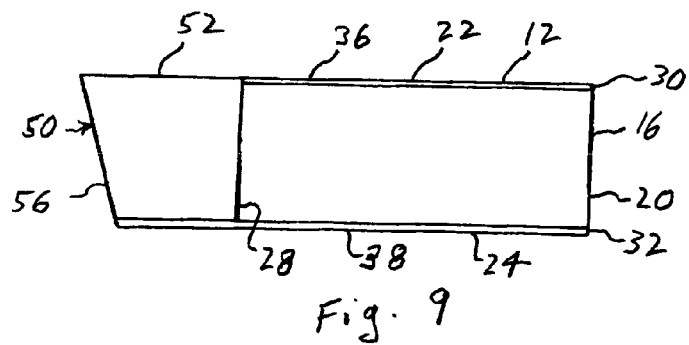
FIG. 9 is a right side view of the insert-blank of FIG. 7.

In a preferred embodiment of the present invention as illustrated in FIGS. 3–6, and as illustrated in FIGS. 1 and 2 mounted to a toolholder, an insert 10 of this invention is provided having a body 12 comprised of a first end 14, a second end 16, a first side 18, a second side 20, a top surface 22 and a bottom surface 24. First end 14 of the apparatus in this preferred embodiment includes the cutting portions of the insert, which are in that portion of the body extending from imaginary lines 26 and 28, respectively, of first side 18 and second side 20. First side 18 and second side 20 of body 12 are generally parallel and opposing each other, and extend from end 14 or from adjacent end 14, i.e., from point or imaginary lines 26 and 28, respectively, to second end 16, as will be hereinafter described.

Top surface 22 of body 12 includes a portion 30 extending from imaginary line 28, i.e. from adjacent first end 14 to second end 16 of body 12, and is inclined downwardly to second side 20 from the perpendicular of the top edge of first side 18 to second side 20. Bottom surface 24 includes a portion 32 extending from the outward end 34 of first end 14 to second end 16 of body 12, and is inclined upwardly to second side 20. Portion 32 may also extend from imaginary line 28 to end 16, but formation of insert 10 is facilitated by forming portion 32 from the outward end 34 of first end 14 to second end 16.

In the preferred embodiment illustrated in FIGS. 3–6, top surface 22 of body 12 includes a second portion 36 extending from the outward end 34 of first end 14 to second end 16 of body 12 perpendicularly from the top edge of first side 18 toward second side 20. Inclined second portion 30 extends from second portion 36, from imaginary line 28 to second end 16, downwardly to second side 20 at an acute angle with respect to second portion 36. Inclined portion 30 does not extend to outward end 34 of first end 14, as extending the inclined portion 30 to end 34 would interfere with the use of the upper corners of end 14 as the cutting portion of insert 10.

Further, in the preferred embodiment illustrated in FIGS. 3–6, bottom surface 24 includes a second portion 38 extending from the outward end 34 of first end 14 to second end 16 of body 12 perpendicularly from the bottom edge of first side 18 toward second side 20. Inclined second portion 32 of bottom surface 24 extends from second portion 38 from outward end 34 of first end 14 to second end 16, upwardly to second side 20 at an acute angle with respect to second portion 38. Inclined portion 32 may extend from imaginary line 28 to end 16, but for facility in forming the insert, it is preferred to form inclined portion 32 so as to extend from outward end 34 of first end 14 to second end 16.

In the preferred embodiment illustrated in FIGS. 3–6, first end 14 of insert 10 has a generally polygonal cross-section. in addition the side walls 40, 42, extending from sides 18 and 20, respectively, of body 12 to outward end of 34 of end 14 are tapered outwardly, as best shown in FIG. 4, to avoid binding in the workpiece when the insert 10 is used for forming grooves of the thickness of the top of outward end 34 of the insert. In addition, in the preferred embodiment shown in FIGS. 3–6, the side wall 40 of end 14 is offset inwardly from wall 18.

In another preferred embodiment, as shown in FIGS. 7–10, an insert-blank 50 is provided in which the body is identical to the body 12 of the first preferred embodiment described and illustrated therein and is designated with the same numerals, and the description thereof is incorporated herein to avoid repetition.

In insert-blank 50, first end 52 has generally parallel side walls 54, 56 extending from walls 18 and 20, respectively, side wall 54 being co-extensive at its top and bottom with wall 18, while side wall 56 is offside transversely outwardly beyond wall 20. As in the case of inclined portion 32 of insert 10, the inclined portion 32 in this embodiment extends from the outward end 52, although it could extend only from imaginary line 28. Insert-blank 50, and particularly its first end 52, is adapted for being formed into an insert portion, for example, by grinding end 52 into the insert portion or end 14 of the insert 10 illustrated in FIGS. 3–6.

Figure 11:
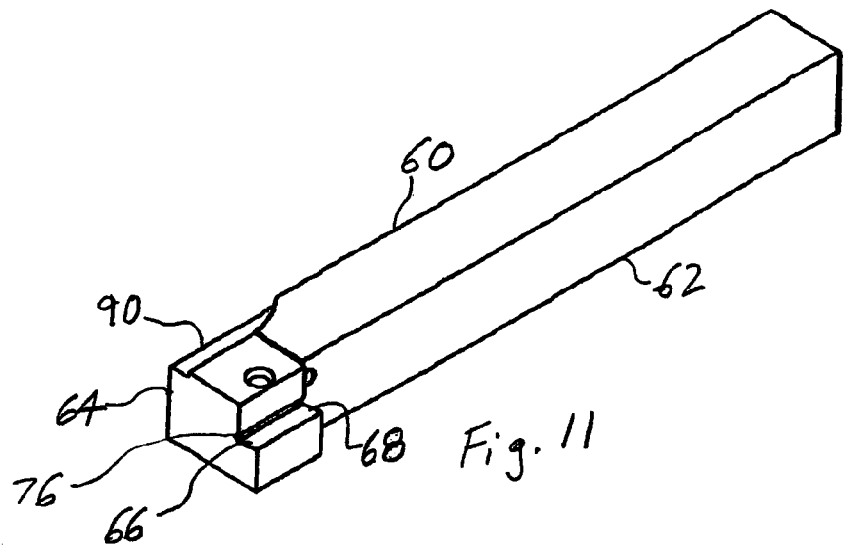
FIG. 11 is a perspective view of a toolholder with which the apparatus of the present invention may be used.
Figure 12:
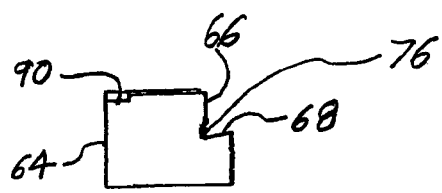
FIG. 12 is a front end view of the toolholder illustrated in FIG. 11.

As illustrated in FIGS. 1 and 2, the apparatus of the present invention is adapted and intended to be secured in a toolholder. As shown in FIGS. 11 and 12, a toolholder 60 with which the apparatus of the present invention may be utilized has a shank 62 and an insert support head 64. The insert support head 64 has an insert support nest or pocket 66 having an inclined bottom wall 68 adapted to receive an inclined bottom surface portion of an insert. The insert can be held therein by a clamp 70, as will be hereinafter described. For example, in the preferred embodiment shown in FIGS. 1 and 2, an insert 10 is secured to a toolholder 60 by a clamp 70, as will be described.

The insert support head 64 of toolholder 60 may be integral with the shank 62, as shown in FIGS. 11 and 12, or may comprise a base integral with shank 62 as shown in FIGS. 1 and 2 supporting a support block 72 which is bolted to shank 62 by means of a machine screw 74. In either case, insert support nest or pocket 66 may have an arcuate cut-out or relief 76 at the junction between inclined bottom wall 68 and the vertical wall forming the nest or pocket 66. The arcuate cut-out or relief 76 helps insure the firm seating of insert 10 within the nest or pocket 66.

As heretofore described, preferably inclined portion 32 of bottom surface 24 is inclined upwardly at an acute angle, from the perpendicular of first side 18, i.e., from portion 38. Moreover, preferably inclined portion 32 is inclined upwardly as stated above at an angle of less than about 30 degrees, and most preferably at an angle of about 10 degrees.

The inclined bottom wall 68 of nest or pocket 66 is also inclined upwardly from the horizontal at an acute angle, preferably at approximately the same angle as the inclined portion 32 of the bottom surface 24.

Figure 13:
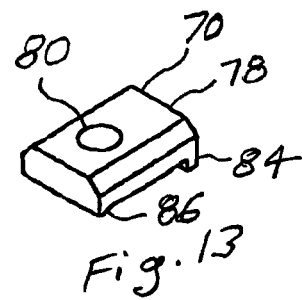
FIG. 13 is a perspective view of a clamp which may be used in cooperation with the toolholder illustrated in FIG. 11 to secure an apparatus of the present invention.
Figure 14:
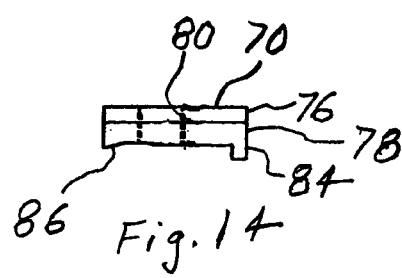
FIG. 14 is a right side view of the clamp illustrated in FIG. 13.
Figure 15:
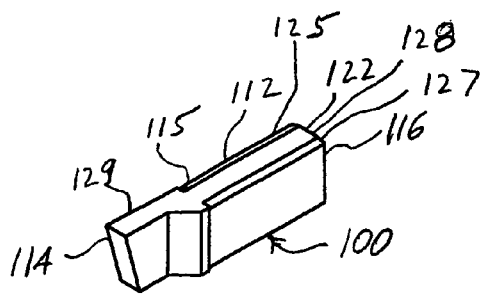
FIG. 15 is a perspective view of apparatus in accordance with another embodiment of the present invention.
Figure 16:
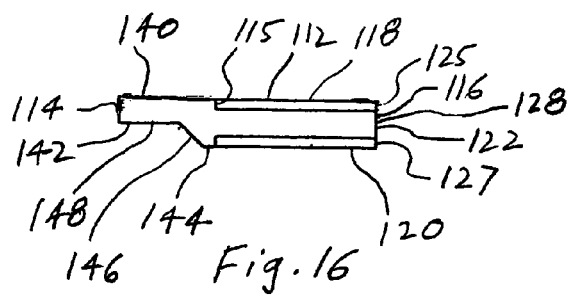
FIG. 16 is a top view of the apparatus of FIG. 15.
Figure 18:
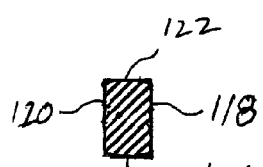
FIG. 18 is a cross-sectional view of the apparatus of FIG. 15 taken along line 18—18 of FIG. 17.
Figure 17:
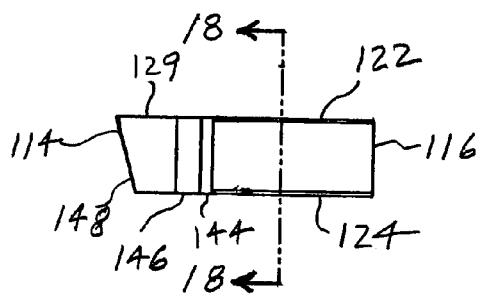
FIG. 17 is a right side view of the apparatus of FIG. 15.
Figure 19:
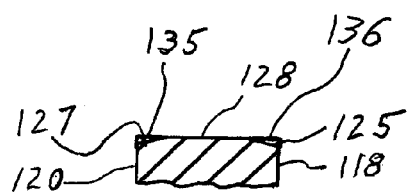
FIG. 19 is an enlarged fragmentary view of the upper portion of the cross-section of the apparatus as shown in FIG. 18.
Figure 20:
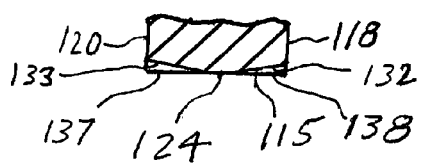
FIG. 20 is an enlarged fragmentary view of the lower portion of the cross-section of the apparatus as shown in FIG. 18.

As heretofore stated, the apparatus of the invention is intended to be secured to the toolholder, as in toolholder 60, by a clamp, such as clamp 70. One example of a suitable clamp 70 is illustrated in FIGS. 13 and 14, and comprises an integral body having a center portion 78, an aperture 80 adapted to receive a fastener, such as a machine screw 82 (FIGS. 1 and 2), to bolt clamp 70 to the support block 72 or insert support head 64. Clamp 70 further includes a fulcrum portion 84 and a finger portion 86 which extends from one side of the center portion 78 to the other. Support block 72 has a slot 88 configured to receive fulcrum portion 84 of clamp 70, as shown in FIGS. 1 and 2. Similarly, head 64 has a shoulder 90 which is configured to receive fulcrum portion 84 of clamp 70 as shown in FIGS. 11 and 12.

Preferably, inclined portion 30 of top surface 22 is inclined downwardly at an acute angle from the perpendicular of first side 18, i.e. from portion 36. More preferably, inclined portion 30 is inclined downwardly at an angle of less than 30 degrees, and most preferably at an angle of about 15 degrees. The finger portion 86 of clamp 70 is inclined downwardly from the horizontal at an acute angle, preferably at approximately the same angle as the inclined portion 30 of the top surface of the insert.

When the clamp 70 is fastened by means of machine screw 82, the center portion 78 of body of clamp 70 acts as a lever with fulcrum portion 84 being forced into slot 88 and against the support block 72 or onto shoulder 90 of the insert support head 64, and the lever force being applied to finger portion 86 against the inclined portion 30 of insert 10. In this manner insert 10 is securely held in the nest or pocket 66 of the toolholder to resist forces exerted by the workpiece, particularly during turning and especially during turning while traversing the workpiece in the direction toward the vertical wall of the nest or pocket 66 as viewed from the insert.

In still another preferred embodiment of the present invention as illustrated in FIGS. 15–20, the numeral 100 indicates apparatus of this invention capable of being an insert, for example, by grinding, or can be a finished insert. Apparatus 100 is particularly adapted to be mounted to a toolholder, in the same manner that insert 10 can be mounted to a toolholder as shown in FIGS. 1 and 2, and also to toolholders having the nest or pocket 66 (FIGS. 11 and 12), on the opposite side of the toolholder (not shown), or transverse to the longitudinal dimension of the toolholder, such a toolholder arrangement being shown in U.S. Pat. No. 5,638,728, FIG. 6.

Apparatus 100, as shown in FIGS. 15–20, includes a body 112 and a head 114 having a rear end 115. Body 112 is integral with head 114 and extends generally longitudinally from rear end 115 to a distal end 116 of body 112 which is opposite rear end 115 in the longitudinal direction. Body 112 also includes a first side 118 and a second side 120, which are generally parallel to each other and extend from rear end 115 to distal end 116. Body 112 also includes a top surface 122 and a bottom surface 124.

In this embodiment, top surface 122 has a first portion 125 which intersects rear end 115, extends from rear end 115 to distal end 116 and is inclined upwardly from first side 118. Top surface 122 has a second portion 127 which also intersects rear end 115, extends from rear end 115 to distal end 116, but is inclined upwardly from second side 120. Top surface 122 preferably also includes a third portion 128 which extends from rear end 115 to distal end 116 and from first portion 125 to second portion 127. Also preferably, third portion 128 extends substantially perpendicularly from the plane of at least one of the sides 118, 120 of the body 112, and may also extend from the top surface 129 of head 114. Most preferably, first portion 125 and second portion 127 extend at acute angles from third portion 128, downwardly, to first side 118 and second side 120, respectively.

Bottom surface 124 of body 112 includes a first portion 132 which intersects rear end 115 and extends from rear end 115 to distal end 116 and is inclined downwardly from first side 118. Bottom surface 124 further includes a second portion 133 which intersects rear end 115, extends from rear end 115 to distal end 116 and is inclined downwardly from second side 120. First portion 132 and second portion 133 of bottom surface 124 form a shallow V-shape in cross-section extending in the longitudinal direction, and is adapted to fit and be seated into a nest or pocket of a toolholder as heretofore described. Preferably first portion 132 and second portion 133 extend from respective side walls at an acute angle to form the shallow V-shaped cross-section for the above stated purpose.

Rear end 115 of head 114 has rearwardly facing portions 135, 136, 137, 138 of rear end 115 not covered or hidden by body 112. Portions 135 and 136 are triangular shaped and appear as triangular corners formed above the intersections of first portion 125 and second portion 127 of top surface 122 with rear end 115; while portions 137 and 138 are triangular shaped and appear as triangular corners formed below the intersections of first portion 132 and second portion 133 with rear end 115. The rearwardly facing portions 137 and 138 are adapted to serve as stops to prevent rearward movement of the apparatus 100 with respect to the machine tool when in use by clamping the apparatus in a toolholder with at least one of portions 137 and 138 bearing against a surface of the toolholder, and securing the toolholder to the machine tool in a manner known to the art. In this manner, apparatus 100 can be secured to prevent its rearward movement while in use. Similarly, either or both of portions 135 and 136 can serve as stops to prevent reardwardly movement of the apparatus 100 while in use by either or both of the portions 135 and 136 bearing against a surface of the toolholder either directly or indirectly by bearing against a surface of the lever-type clamp, as in FIGS. 1 and 2.

It is further provided in this embodiment that head 114 has a polygonal cross-section and has a pair of side walls 140 and 142 with at least a portion of each side wall extending from the sides 118 and 120, respectively, of body 112. It is preferable that at least one side wall 140 of head 114 extends from body 112 at an acute angle, for example, an angle of less than about 15 degrees outwardly from side 118 of body 112, more preferably at an angle of less than about 5 degrees therefrom, and most preferably at an angle therefrom of approximately 2½ degrees. In the case where apparatus 100 is a blank, the head 114 is adapted to being formed into the head of an insert, for example by grinding the head to the desired dimensions of the cutting portion of the insert.

In this embodiment, side wall 142 of head 114 comprises a first portion 144 extending outwardly generally longitudinally from wall 120 of body 112. Wall 142 preferably includes a second portion 146 extending at an angle from first portion 144, preferably inwardly therefrom, and includes a third portion 148 extending outwardly from portion 146 to the outer end of head 114. Preferably, the second portion 146 of wall 142 extends inwardly from portion 144 at an angle of less than 90 degrees, most preferably at approximately 45 degrees, and third portion 148 extends from second portion 146 at an angle of greater than 90 degrees, most preferably at approximately 135 degrees therefrom, to the outer end of head 114.

Figure 21:
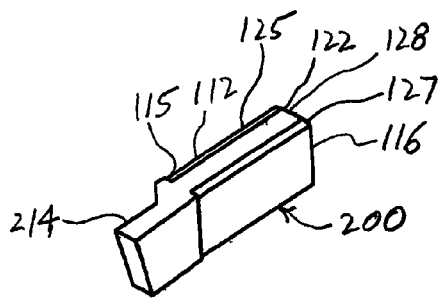
FIG. 21 is a perspective view of apparatus in accordance with still another embodiment of the present invention.
Figure 22:
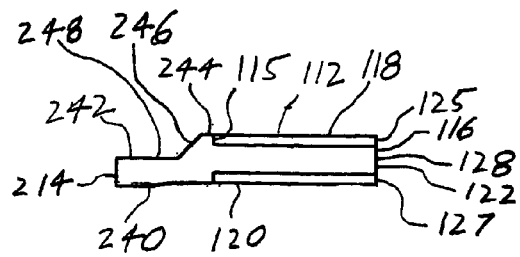
FIG. 22 is a top view of the apparatus of FIG. 21.
Figure 23:
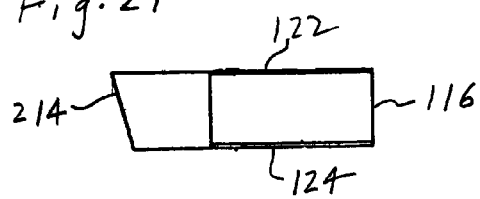
FIG. 23 is a right side view of the apparatus of FIG. 22.

In still another embodiment, as illustrated in FIGS. 21–23, the apparatus 200 is a mirror image of the apparatus 100 illustrated in FIGS. 15–20, and identical numerals are used in FIGS. 21–23 for identical elements of the apparatus are not explained further herein for the sake of brevity. In addition the cross-sectional views of FIGS. 18–20, and the description of the elements in those views apply to the apparatus 200 of this embodiment and are not repeated herein. As noted in FIGS. 21–23, head 214 is the mirror image of head 114 in the previous embodiment and includes rear end 115 which is integral with body 112. As in the previous embodiment, body 112 with top surface 122 and bottom surface 124 is adapted to fit into the nest or pocket of a toolholder and be clamped therein, and rear end 115 of head 214 has triangular corners 135, 136, 137 and 138 which are adapted to serve as stops as heretofore described.

In this embodiment, side wall 240 extends from body 112 at an acute angle, preferably at an angle of less than 15 degrees outwardly from side 120 of body 112, more preferably at an angle of less than about 5 degrees therefrom, and most preferably at an angle therefrom of approximately 2½ degrees. As in the case of the previous embodiment, where apparatus 200 is a blank, the head 214 is adapted to being formed into the head of an insert, for example by grinding to desired dimensions.

Also in this embodiment, head 214 has a second side wall 242 which includes a first portion 244 extending outwardly generally longitudinally from side wall 118 of body 112. Wall 242 includes a second portion 246 extending at an angle from first portion 244, preferably inwardly therefrom, and includes a third portion 248 extending outwardly from portion 246 to the outer end of head 214. As in the case of the previous embodiment, the second portion 246 of wall 242 extends inwardly from portion 244 at an angle of less than 90 degrees, most preferably at approximately 45 degrees, and third portion 248 extends from second portion 246 at an angle of greater than 90 degrees, most preferably at approximately 135 degrees therefrom, to the end of head 214.

As described, the embodiment of the apparatus shown in FIGS. 21–23 has the head 214 with its cutting surface, or if a blank with head 214 formable into a cutting surface, for example by grinding with the head to the right side of the apparatus (facing the head end of the apparatus), while the embodiment of the apparatus shown in FIGS. 15–20 has the head at the left side of the apparatus (again facing the head end of the apparatus). In this manner a small-size apparatus, especially an insert, for example of a cutting end width of 0.085 inch or less, is provided with clearance of some areas of the workpiece where a larger insert would not generally be usable. Having right-hand and left-hand inserts in this manner is particularly useful when clamped to right-hand or left-hand toolholders known to the art.

Figure 24:
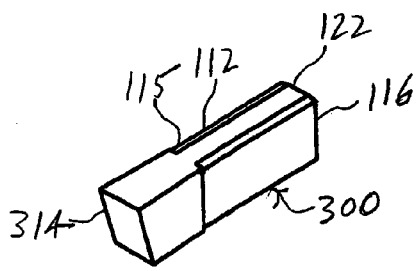
FIG. 24 is a perspective view of apparatus in accordance with another embodiment of the present invention.
Figure 25:
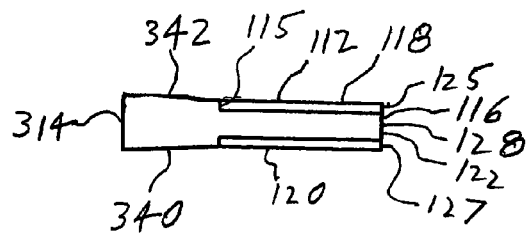
FIG. 25 is a top view of the apparatus of FIG. 24.
Figure 26:
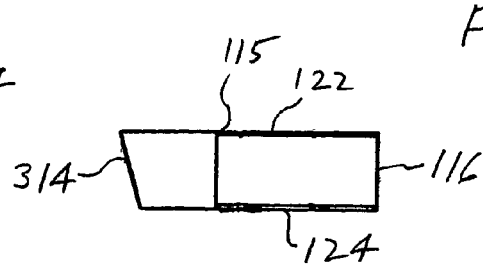
FIG. 26 is a right side view of the apparatus of FIG. 24.
Figure 27:
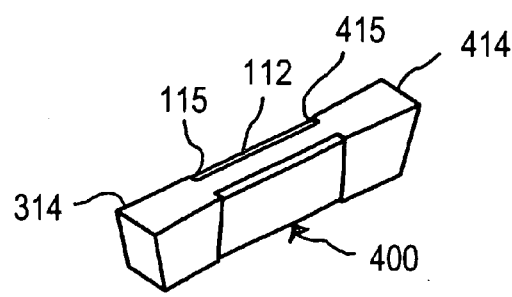
FIG. 27 is a perspective view of apparatus in accordance with still another embodiment of the present invention.
Figure 28:
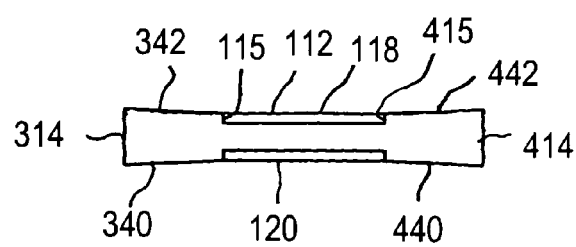
FIG. 28 is a top view of the apparatus of FIG. 27.
Figure 30:
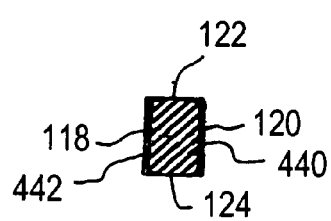
FIG. 30 is a cross-sectional view of the apparatus of FIG. 27 taken along line 31—31 of FIG. 29.
Figure 29:
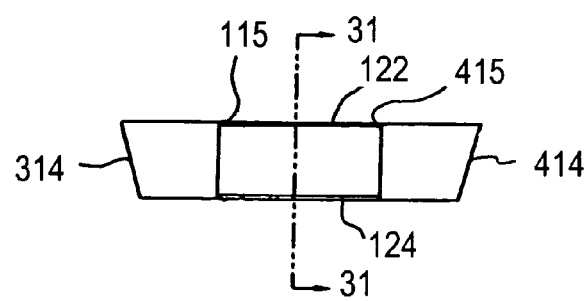
FIG. 29 is a right side view of the apparatus of FIG. 27.
Figure 31:
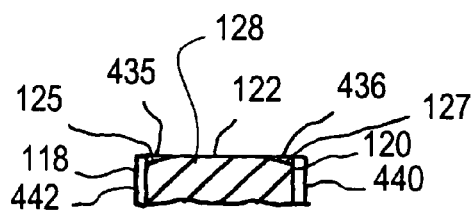
FIG. 31 is an enlarged fragmentary view of the upper portion of the cross-section of the apparatus as shown in FIG. 30.
Figure 32:
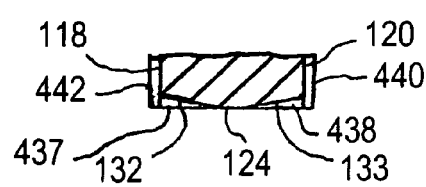
FIG. 32 is an enlarged fragmentary view of the lower portion of the cross-section of the apparatus as shown in FIG. 30.

In another embodiment of the present invention, as shown in FIGS. 24–26, the apparatus 300 has a body 112 with distal end 116, side walls 118 and 120 and top surface 122 and bottom surface 124 as heretofore described in connection with the embodiments shown in FIGS. 15–21 and 21–23, and described above. Apparatus 300 has a head 314 with a rear end 115 identical to rear end 115 in the previous two embodiments, and with body 112 forms triangular corners 135, 136, 137 and 138 adapted to serve as stops as heretofore described. Body 112 of apparatus 300 is also adapted to fit into the nest or toolholder and be claimed therein, also as heretofore described.

In the embodiment shown in FIGS. 24–26, head 314 has both side walls 340 and 342 extending from corresponding sides 120 and 118 at an acute angle, preferably at an angle of less than 15 degrees outwardly from sides 120 and 118 of body 112, more preferably at an angle of less than about 5 degrees therefrom, and most preferably at an angle therefrom of approximately 2½ degrees to the outer end of head 314. Apparatus 300 is particularly useful as a blank which can be formed into an insert, for example as either the left-hand or right-hand apparatus in the embodiments shown in FIGS. 15–20 or FIGS. 21–23, or for larger small-size inserts, for example 0.085 or greater inch cutting widths, but within the earlier indication of small-size inserts.

Another embodiment of this invention is illustrated in FIGS. 27–32. In this embodiment, apparatus 400 has a body 112, with sides 118 and 120, extending from rear end 115 of a first head 314, but its distal end is integral with a rear end 415 of a second head 414, which can be the mirror image of first head 314. As shown, head 414 has side walls 440 and 442 extending from sides 120 and 118 in the same manner as side walls 340 and 342 extend from those sides 120 and 118. Alternatively, head 414 can be of different configuration, for example, of the configuration of heads 114 or 214, but such alternative configuration would defeat the advantage of having an apparatus with two identical heads which are interchangeable and useful for repositioning the apparatus to use the second head when the first is worn or chipped and can no longer be accurately used in the machine tool.

Apparatus 400 with rear end 115 provides triangular portions or corners 135, 136, 137 and 138 above and below its intersections with body 112, respectively, which can serve as stops as heretofore described, and also with rear end 415 of head 414 provides triangular portions or corners 435, 436, 437 and 438 above and below its intersections with body 112, respectively, which can serve as stops, in the same manner as portions or corners 135, 136, 137 and 138, with abutting portions of the toolholder or the machine tool (not shown). In this manner, apparatus 400 is desirably useful as a blank which can be formed into a double-headed or double-ended insert, or as such an insert as earlier described herein.

While a particular embodiment of the grooving and turning insert of the invention has been shown and described, it will be appreciated by those skilled in the art that changes and modifications may be made thereto without departing from the invention in its broader aspects and as set forth in the following claims.

What is claimed is:

1. An insert adapted for use with a toolholder having a pocket for receiving the insert for use in connection with a machine tool for grooving and turning, said insert comprising:
   a. a first head having a cutting end, and
   b. a second head spaced from said first head and having a cutting end of a configuration different from the cutting end of said first head; and
   c. a body integral with said first and second heads and extending generally longitudinally between the heads, said body having:
      (i) first and second sides which are generally parallel and opposite each other and extend generally from the first head to the second head;
      (ii) a top surface extending generally continuously for the majority of the distance between said first head and said second head, said top surface being defined at least in part by a first uninterrupted generally planar surface extending continuously for the majority of the distance between said heads and inclined upwardly relative to said first side, and a second uninterrupted generally planar surface extending continuously for the majority of the distance between said heads and inclined upwardly relative to said second side;
      (iii) a bottom surface extending generally continuously for the majority of the distance between said first head and said second head, said bottom surface being defined at least in part by a first uninterrupted generally planar surface extending continuously for the majority of the distance between said heads and inclined downwardly relative to said first side, and a second uninterrupted generally planar surface extending continuously for the majority of the distance between said heads and inclined downwardly relative to said second side; wherein at least one of each pair of upwardly and downwardly inclined planar surfaces are adapted to be utilized simultaneously for clamping said insert within and to the pocket of the toolholder.

2. The insert of claim 1, wherein at least one of the portions thereof rearwardly of each of said heads extends at least partially (a) below the downwardly inclined first and second planar surfaces of said bottom surface of the body and (b) above the upwardly inclined first and second planar surfaces of said top surface of the body, and is adapted to serve as a stop to limit rearward movement of the insert with respect to one of said heads and the toolholder when in use.

3. The insert of claim 1, wherein one portion thereof rearwardly of each of said heads extends at least partially below at least one of the downwardly inclined first and second planar surfaces of said bottom surface of the body and is adapted to serve as a stop to limit rearward movement of the insert with respect to one of the said heads and the toolholder when in use.

4. The insert of claim 1, wherein a plurality of portions thereof of each of said heads extends at least partially below the downwardly inclined first and second planar surfaces of said bottom surface of the body and are each adapted to serve as stops to limit rearward movement of the insert with respect to one of said heads and the toolholder when in use.

5. An insert adapted for use with a toolholder having a pocket for receiving the insert for use in connection with a machine tool for grooving and turning said insert, comprising:
   a. a first head having a cutting end, and
   b. a second head spaced from said first head and having a cutting end of a configuration different from the cutting end of said first head; and
   c. a body integral with said first and second heads and extending generally longitudinally between the said heads; said body having:
      (i) first and second sides which are generally parallel and opposite each other and extend generally from said first head to said second head;
      (ii) a top surface extending generally continuously for the majority of the distance between said first head and said second head, said top surface being defined at least in part by a first uninterrupted generally planar surface extending continuously for the majority of the distance between the heads and to said distal end and inclined upwardly relative to said first side, and a second uninterrupted generally planar surface extending continuously for the majority of the distance between said heads and inclined upwardly relative to said second side, and a third uninterrupted generally planar surface extending continuously for the majority of the distance between the heads and from said first portion of said top surface portion to said second portion of the top surface portion and extending substantially perpendicularly from the plane of at least one of the side of the body;

(iii) a bottom surface extending generally continuously for the majority of the distance between said first head and said second head, said bottom surface being defined at least in part by a first uninterrupted generally planar surface extending continuously for the majority of the distance between said heads and inclined downwardly relative to said first side, and a second uninterrupted generally planar surface extending continuously for the majority of the distance between said heads and inclined downwardly relative said second side; wherein at least one of each pair of said upwardly and downwardly inclined planar surfaces are adapted to be utilized simultaneously for clamping said insert within and to the pocket of the toolholder; and (iv) at least one of the portions thereof rearwardly of each of said heads (a) extending at least partially below the downwardly inclined first and second planar surfaces of said bottom surface of the body and (b) above the upwardly inclined first and second planar surfaces of said top surface of the body, is adapted to serve as a stop to limit rearward movement of the insert with respect to one of said heads and the toolholder when in use.

6. The insert of claim 5 wherein at least one portion thereof rearwardly of each of said heads extends at least partially below at least one of the downwardly inclined first and second planar surfaces of said bottom surface of the body and is adapted to serve as a stop to limit rearward movement of the insert with respect to one of said heads and the toolholder when in use.

7. A product adapted for use with a toolholder having a pocket for receiving the product for use in connection with a machine tool for grooving and turning, said product comprising:

a. a first head adapted to be formed into a cutting end, and b. a second head spaced from said first head and adapted to be formed into a cutting end; and c. a body integral with said first and second heads and extending generally longitudinally between the heads, said body having:

(i) first and second sides which are generally parallel and opposite each other and extend generally from the first head to the second head;

(ii) a top surface extending generally continuously for the majority of the distance between said first head and said second head, said top surface being defined at least in part by a first uninterrupted generally planar surface extending continuously for the majority of the distance between said heads and inclined upwardly relative to said first side, and a second uninterrupted generally planar surface extending continuously for the majority of the distance between said heads and inclined upwardly relative to said second side;

(iii) a bottom surface extending generally continuously for the majority of the distance between said first head and said second head, said bottom surface being defined at least in part by a first uninterrupted generally planar surface extending continuously for the majority of the distance between said heads and inclined downwardly relative to said first side, and a second uninterrupted generally planar surface extending continuously for the majority of the distance between said heads and inclined downwardly relative to said second side; wherein at least one of each pair of upwardly and downwardly inclined planar surfaces are adapted to be utilized simultaneously for clamping said product within and to the pocket of the toolholder.

8. The product of claim 7, wherein at least one of the portions thereof rearwardly of each of said heads extends at least partially (a) below the downwardly inclined first and second planar surfaces of said bottom surface of the body and (b) above the upwardly inclined first and second planar surfaces of said top surface of the body, and is adapted to serve as a stop to limit rearward movement of the product with respect to one of said heads and the toolholder when in use.

9. The product of claim 7, wherein one portion thereof rearwardly of each of said heads extends at least partially below at least one of the downwardly inclined first and second planar surfaces of said bottom surface of the body and is adapted to serve as a stop to limit rearward movement of the product with respect to one of the said heads and the toolholder when in use.

10. The product of claim 7, wherein a plurality of portions thereof of each of said heads extends at least partially below the downwardly inclined first and second planar surfaces of said bottom surface of the body and are each adapted to serve as a stop to limit rearward movement of the product with respect to one of said heads and the toolholder when in use.

11. An insert adapted for use with a toolholder having a pocket for receiving the insert for use in connection with a machine tool for grooving and turning said insert, comprising:

a. a first head having a cutting end, and b. a second head spaced from said first head and having a cutting end of a configuration different from the cutting end of said first head; and c. a body integral with said first and second heads and extending generally longitudinally between the said heads; said body having:

(i) first and second sides which are generally parallel and opposite each other and extend generally from said first head to said second head;

(ii) a top surface extending generally continuously for the majority of the distance between said first head and said second head, said top surface being defined at least in part by a first uninterrupted generally planar surface extending continuously for the majority of the distance between the head and to said distal end and inclined upwardly relative to said first side, and a second uninterrupted generally planar surface extending continuously for the majority of the distance between said heads and inclined upwardly relative to said second side, (iii) a bottom surface extending generally continuously for the majority of the distance between said first head and said second head, said bottom surface being defined at least in part by a first uninterrupted generally planar surface extending continuously for the majority of the distance between said heads and inclined downwardly relative to said first side, and a second uninterrupted generally planar surface extending continuously for the majority of the distance between said heads and inclined downwardly relative said second side; wherein at least one of each pair of said upwardly and downwardly inclined planar surfaces are adapted to be utilized simultaneously for clamping said insert within and to the pocket of the toolholder; and (iv) at least one of the portions thereof rearwardly of each of said heads (a) extending at least partially below the downwardly inclined first and second planar surfaces of said bottom surface of the body and (b) above the upwardly inclined first and second planar surfaces of said top surface of the body, is adapted to serve as a stop to limit rearward movement of the insert with respect to one of said heads and the toolholder when in use.

12. The insert of claim 11 wherein at least one portion thereof rearwardly of each of said heads extends at least partially below at least one of the downwardly inclined first and second planar surfaces of said bottom surface of the body and is adapted to serve as a stop to limit rearward movement of the insert with respect to one of said heads and the toolholder when in use.

13. The insert of claim 11, wherein a plurality of portions thereof of each of said heads extends at least partially below the downwardly inclined first and second planar surfaces of said bottom surface of the body and are each adapted to serve as stops to limit rearward movement of the insert with respect to one of said heads and the toolholder when in use.

* * * * *